United States Patent
Medaghri Alaoui et al.

(10) Patent No.: US 9,766,854 B2
(45) Date of Patent: Sep. 19, 2017

(54) METHODS AND ELECTRONIC DEVICES FOR DYNAMIC CONTROL OF PLAYLISTS

(71) Applicant: SPOTIFY AB, Stockholm (SE)

(72) Inventors: Souheil Medaghri Alaoui, New York City, NY (US); Miles Lennon, New York City, NY (US); Kieran Del Pasqua, New York City, NY (US)

(73) Assignee: SPOTIFY AB, Stockholm (SE)

(*) Notice: Subject to any disclaimer, the term of this patent is extended or adjusted under 35 U.S.C. 154(b) by 0 days.

(21) Appl. No.: 14/839,458

(22) Filed: Aug. 28, 2015

(65) Prior Publication Data
US 2016/0335048 A1 Nov. 17, 2016

Related U.S. Application Data

(63) Continuation of application No. 14/714,153, filed on May 15, 2015.

(51) Int. Cl.
| | | |
|---|---|---|
| *G06F 17/00* | (2006.01) | |
| *G06F 3/16* | (2006.01) | |
| *G05B 15/02* | (2006.01) | |
| *G06F 17/30* | (2006.01) | |
| *H04L 29/06* | (2006.01) | |

(52) U.S. Cl.
CPC ............. *G06F 3/165* (2013.01); *G05B 15/02* (2013.01); *G06F 17/30772* (2013.01); *H04L 65/60* (2013.01)

(58) Field of Classification Search
CPC ................................................ G06F 17/30772
See application file for complete search history.

(56) References Cited

U.S. PATENT DOCUMENTS

| | | |
|---|---|---|
| 5,892,915 A | 4/1999 | Duso et al. |
| 6,031,478 A | 2/2000 | Oberhammer et al. |
| 6,938,209 B2 | 8/2005 | Ogawa et al. |
| 7,650,570 B2 | 1/2010 | Torrens et al. |
| 7,656,327 B2 | 2/2010 | Filipovic et al. |
| 7,685,210 B2 | 3/2010 | Plastina et al. |
| 7,873,426 B2 | 1/2011 | Yamada |
| 8,271,112 B2 | 9/2012 | Fujihara et al. |
| 9,195,383 B2 | 11/2015 | Garmark et al. |

(Continued)

FOREIGN PATENT DOCUMENTS

WO 2014/001913 3/2014

OTHER PUBLICATIONS

Office Action dated Feb. 11, 2016 issued by United States Patent and Trademark Office on U.S. Appl. No. 14/839,427, 15 pages.

(Continued)

*Primary Examiner* — Fan Tsang
*Assistant Examiner* — David Siegel
(74) *Attorney, Agent, or Firm* — Tucker Ellis LLP

(57) ABSTRACT

This disclosure concerns the playback of audio content, e.g. in the form of music. More particularly, the disclosure concerns the playback of streamed audio. In one example embodiment, there is a method of operating an electronic device for dynamically controlling a playlist including one or several audio items. A request to adjust an energy level (e.g. a tempo) associated with the playlist is received. In response to receiving this request, the playlist is adjusted in accordance with the requested energy level (e.g., the tempo).

27 Claims, 12 Drawing Sheets

(56) References Cited

U.S. PATENT DOCUMENTS

| | | |
|---|---|---|
| 2002/0019858 A1 | 2/2002 | Kaiser et al. |
| 2003/0221541 A1 | 12/2003 | Platt |
| 2006/0122842 A1* | 6/2006 | Herberger .............. G10H 1/368 704/278 |
| 2006/0143236 A1 | 6/2006 | Wu |
| 2006/0236847 A1 | 10/2006 | Withop |
| 2007/0162876 A1 | 7/2007 | Quirk |
| 2008/0051919 A1 | 2/2008 | Sakai et al. |
| 2008/0188354 A1 | 8/2008 | Pauws et al. |
| 2008/0250315 A1 | 10/2008 | Eronen et al. |
| 2008/0313222 A1 | 12/2008 | Vignoli et al. |
| 2009/0049979 A1 | 2/2009 | Naik et al. |
| 2009/0063414 A1 | 3/2009 | White et al. |
| 2009/0089327 A1 | 4/2009 | Kalaboukis et al. |
| 2011/0004330 A1 | 1/2011 | Rothkopf et al. |
| 2011/0016120 A1 | 1/2011 | Haughay et al. |
| 2011/0016394 A1 | 1/2011 | DuKane |
| 2011/0035033 A1 | 2/2011 | Friedenberger |
| 2011/0066943 A1 | 3/2011 | Brillon et al. |
| 2011/0246508 A1* | 10/2011 | Maekawa ......... G06F 17/30017 707/769 |
| 2011/0252118 A1 | 10/2011 | Pantos et al. |
| 2012/0185070 A1 | 7/2012 | Hagg et al. |
| 2012/0215684 A1 | 8/2012 | Kidron |
| 2012/0311443 A1 | 12/2012 | Chaudhri et al. |
| 2012/0315012 A1 | 12/2012 | Mees |
| 2013/0123583 A1 | 5/2013 | Hill |
| 2013/0178962 A1 | 7/2013 | DiMaria et al. |
| 2013/0205243 A1 | 8/2013 | Rivera et al. |
| 2013/0211565 A1* | 8/2013 | Kimoto ............. G06F 17/30752 700/94 |
| 2013/0339853 A1 | 12/2013 | Hierons et al. |
| 2014/0006483 A1 | 1/2014 | Garmark et al. |
| 2014/0059430 A1 | 2/2014 | White et al. |
| 2014/0123006 A1 | 5/2014 | Chen et al. |
| 2014/0164998 A1 | 6/2014 | Jadhav et al. |
| 2014/0180762 A1* | 6/2014 | Gilbert ............. G06F 17/30752 705/7.29 |
| 2014/0250208 A1 | 9/2014 | Billmaier et al. |
| 2014/0280181 A1 | 9/2014 | Rodger et al. |
| 2014/0281972 A1 | 9/2014 | Kramer et al. |
| 2014/0359444 A1 | 12/2014 | Greenberg-Sanders et al. |
| 2015/0186509 A1 | 7/2015 | Kelly et al. |
| 2015/0288779 A1 | 10/2015 | Okumura et al. |
| 2016/0027421 A1 | 1/2016 | Eronen et al. |
| 2016/0179318 A1 | 6/2016 | Patel |

OTHER PUBLICATIONS

Office Action dated Dec. 18, 2015 issued by United States Patent and Trademark Office on U.S. Appl. No. 14/839,440, 15 pages.
Office Action dated Jul. 12, 2016 issued by United States Patent and Trademark Office on U.S. Appl. No. 14/714,153, 13 pages.
Office Action dated Sep. 8, 2016 issued by United States Patent and Trademark Office on U.S. Appl. No. 14/839,427, 18 pages.
Office Action dated Oct. 20, 2016 issued by United States Patent and Trademark Office on U.S. Appl. No. 14/714,148, 14 pages.
ID3 draft specification, copyright Nov. 2000, 41 pages.
Office Action dated Jul. 15, 2016 issued by United States Patent and Trademark Office on U.S. Appl. No. 14/839,440, 15 pages.
Office Action dated Dec. 8, 2016 issued by United States Patent and Trademark Office on U.S. Appl. No. 14/714,153, 17 pages.
Office Action dated Feb. 7, 2017 issued by United States Patent and Trademark Office on U.S. Appl. No. 14/839,427, 10 pages.
"Changing The Video In The Player When The Current Playlist Changes", published Jan. 27, 2011 to https://support.brightcove.com/en/video-cloud/docs/changing-video-player-when-current-playlist-changes, retrieved Jan. 26, 2017.
Office Action dated Mar. 7, 2017 issued by United States Patent and Trademark Office on U.S. Appl. No. 14/714,145, 11 pages.
Office Action dated Mar. 10, 2017 issued by United States Patent and Trademark Office on U.S. Appl. No. 14/839,440, 14 pages.
Office Action dated Jul. 13, 2017 issued by United States Patent and Trademark Office on U.S. Appl. No. 14/839,427, 18 pages.

* cited by examiner

METHODS AND ELECTRONIC DEVICES FOR DYNAMIC CONTROL OF PLAYLISTS

CLAIM OF PRIORITY

This application is a continuation of and claims priority to U.S. patent application Ser. No. 14/714,153, titled "METHODS AND ELECTRONIC DEVICES FOR DYNAMIC CONTROL OF PLAYLISTS", filed May 15, 2015, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present disclosure generally relates to the providing of audio, and more particularly to the streaming of audio, such as music. In particular, the embodiments described herein relate to methods and electronic devices for dynamic control of playlists. More specifically, the embodiments described herein concern methods and electronic devices for dynamic control of playlists, whereby the playlists can be adjusted (or, prepared) in accordance with a requested energy level.

BACKGROUND

As computer technology has improved, the digital media industry has evolved greatly in recent years. Users are able to use electronic devices such as mobile communication devices (e.g., cellular telephones, smart phones, tablet computers, etc.) to consume music, video and other forms of media content. For instance, users can listen to audio content (e.g., music) and/or watch video content (e.g., movies, television (TV) broadcasts, etc.) on a variety of electronic devices.

At the same time, advances in network technology have increased the speed and reliability with which information can be transmitted over computer networks. It is therefore possible for users to stream media content over computer networks as needed, or on demand, rather than receiving a complete file in physical media (such as a CD or a DVD, or downloading the entire file) before consuming the media content.

At social gatherings, users often wish to share media content with friends, relatives, and new acquaintances. For example, a party host may access media content on a portable electronic device, such as a mobile phone or a tablet computer, and present media content through a media presentation system (e.g., play music on one or several speakers or stream video on a screen).

SUMMARY

It is in view of the above considerations and others that the various embodiments disclosed herein have been made.

It is a general object of the embodiments described herein to allow for an improved way of controlling playback of audio, such as music, e.g. at social gatherings.

This general object has been addressed by the appended independent claims. Advantageous embodiments are defined in the appended dependent claims.

In a first of its aspects, this disclosure concerns a method of operating an electronic device for dynamically controlling a playlist of audio items. The method comprises receiving a request to adjust an energy level associated with the playlist; and in response to receiving said request, adjusting the playlist in accordance with the requested energy level.

The energy level may be indicative of an average tempo of the audio items included in said playlist. Furthermore, said tempo may for example be measured in Beats Per Minute (BPM).

In some embodiments, the method further comprises displaying a visual array of selectable mood options at a user interface of the electronic device, wherein each selectable mood option is associated with a respective mood. Furthermore, receiving the request to adjust the energy level may comprise receiving an instruction to select one of the selectable mood options.

In some embodiments, adjusting the playlist in accordance with the requested energy level additionally comprises: sending a data message including an instruction to a computer server system to return a proposed playlist of audio items in accordance with the requested energy level; and receiving a data message including data related to a proposed playlist of audio items; in response thereto generating, based on said data related to the proposed playlist, a visual queue of selectable audio items corresponding to the proposed playlist; and in response thereto displaying the visual queue of selectable audio items at the user interface of the electronic device.

In a second of its aspects, this disclosure concerns an electronic device for dynamically controlling a playlist of audio items. The electronic device comprises a processor and a memory. The electronic device may also comprise a transmitter and a receiver, or alternatively a transceiver. Still further, the electronic device may comprise a user interface.

The memory may store computer program code, which, when run in the processor causes the electronic device to receive a request to adjust an energy level associated with the playlist; and in response thereto adjust the playlist in accordance with the requested energy level.

The energy level may be indicative of an average tempo of the audio items included in said playlist. Furthermore, said tempo may for example be measured in Beats Per Minute (BPM).

In some embodiments, a user interface is adapted to display a visual array of selectable mood options, wherein each selectable mood option is associated with a respective mood. The memory may additionally store computer program code, which, when run in the processor causes the user interface to receive an instruction to select one of the selectable mood options.

In some embodiments, the memory may also store computer program code, which, when run in the processor causes the electronic device to: send, by means of the transmitter, a data message including an instruction to a computer server system to return a proposed playlist of audio items in accordance with the requested energy level; and receive, by means of the receiver, a data message including data related to a proposed playlist of audio items; in response thereto generate, based on said data related to the proposed playlist, a visual queue of selectable audio items corresponding to the proposed playlist; and in response thereto display the visual queue of selectable audio items at the user interface.

In some embodiments, the electronic device is a portable electronic device, such as a mobile telephone, a cellular telephone, a tablet computer, a laptop computer, or a personal digital assistant.

In alternative embodiments, the electronic device is a stationary electronic device such as a stationary computer.

In a third of its aspects, this disclosure concerns a computer program. The computer program comprises instructions which, when executed on at least one processor, cause the at least one processor to carry out the method according to the first aspect. A carrier comprising the computer program may also be provided. The carrier may for example be one of an electronic signal, an optical signal, a radio signal, or a computer readable storage medium.

Various embodiments described herein allow for a user of an electronic device to dynamically control the energy level (e.g., the tempo) of a playlist of audio items, such as songs. In some advantageous embodiments, the energy level of a playlist can be adjusted based on a selected mood option corresponding to a selected mood. Thus, in one example scenario, a party host (i.e., a user) may dynamically control the tempo of songs to be played next based on a current mood of the people at a social gathering (e.g., a party). This may improve the experience of social gatherings such as parties. According to some embodiments, it may also be possible to influence the mood of people at a social gathering. For example, if a party host wishes to change the mood of the people at a social gathering, he or she may in some embodiments select a mood option to adjust the energy level of the playlist and, accordingly, the songs to be played next at the social gathering.

BRIEF DESCRIPTION OF THE DRAWINGS

These and other aspects, features and advantages will be apparent and elucidated from the following description of various embodiments, reference being made to the accompanying drawings, in which.

DETAILED DESCRIPTION

The present invention will now be described more fully hereinafter. The invention may, however, be embodied in many different forms and should not be construed as limited to the embodiments set forth herein; rather, these embodiments are provided by way of example so that this disclosure will be thorough and complete, and will fully convey the scope of the invention to those persons skilled in the art. Like reference numbers refer to like elements or method steps throughout the description.

As described earlier, some existing solutions for controlling the playback of audio, such as music, may be inadequate. It is therefore a general object of the embodiments described herein to allow for an improved way of controlling playback of audio, such as music, e.g. at social gatherings.

To address this, in accordance with an embodiment, described herein are a method and an electronic device for dynamically controlling a playlist of audio items. A request, or instruction, to adjust an energy level associated with the playlist is received and, in response thereto, the playlist is adjusted or otherwise changed in accordance with the requested energy level.

This way, it is made possible to enable a user of an electronic device to dynamically control the energy level (e.g., a tempo) associated with playlists in real time. In some advantageous embodiments, the energy level associated with the playlist can be adjusted based on a selected mood option corresponding to a selected mood. Thus, in one example scenario, a party host (i.e., a user) may dynamically control the tempo of songs to be played next based on a current mood of the people at a social gathering (e.g., a party). This may improve the experience of social gatherings, such as parties. According to some embodiments, it may also be possible to influence the mood of people at a social gathering. For example, if a party host wishes to change the mood of the people at the social gathering, he or she may in some embodiments select a mood option to adjust the energy level of the playlist and, accordingly, the songs to be played next.

Figure 1:
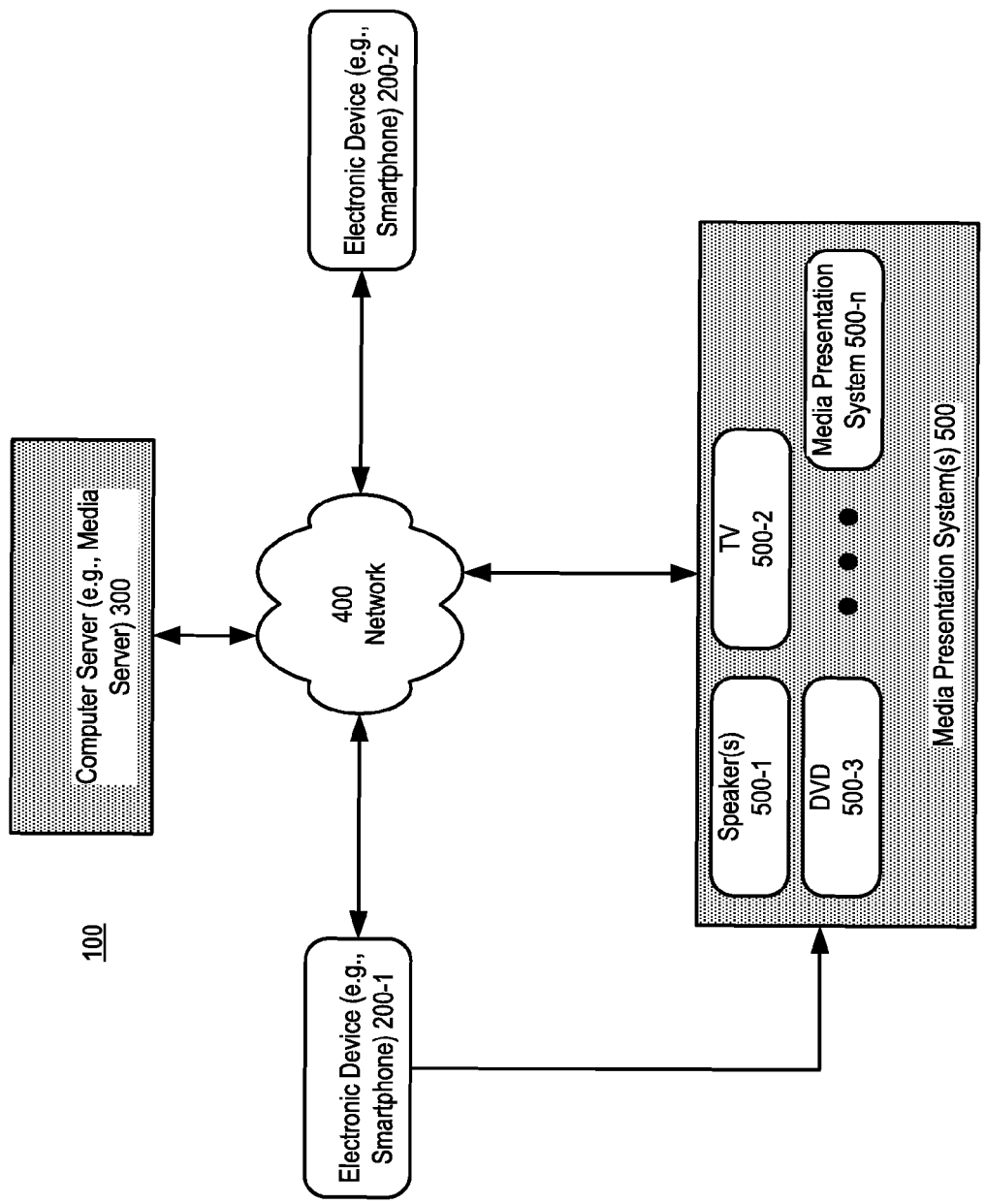
FIG. 1 is a block diagram schematically illustrating an exemplary media content delivery system in accordance with some embodiments.

FIG. 1 is a block diagram illustrating an exemplary media content delivery system 100 in accordance with some embodiments. The media content delivery 100 may comprise one or several electronic devices 200 (e.g., electronic device 200-1 and electronic device 200-2), one or more computer servers 300 (e.g., media content servers also known as media servers), and one or more media presentation systems (e.g., media presentation systems 500 including speaker(s) 500-1, television (TV) 500-2, Digital Versatile Disk (DVD) 500-3, and/or other media presentation system 500-n).

In some embodiments, the electronic device 200 may be a mobile telephone, such as a smart phone. Alternatively, the electronic device 200 may be a tablet computer. In yet other embodiments, the electronic device 200 may be any other electronic device capable of playback of media content such as, for example, one of the electronic devices of the following group: a personal computer, a laptop, and a mobile electronic device (e.g. a handheld entertainment device, a digital media player, or other media device).

One or several networks (e.g., network(s) 400) may communicatively connect each component of the media content delivery system 100 with other components of the media content delivery system 100. The network(s) 400 may include public communications networks, private communication networks or a combination of both public and private communication networks. For example, the networks(s) may include any network(s) such as the Internet, other wide area networks (WAN), local area networks (LAN), virtual private networks (VPN), metropolitan area networks (MAN), peer-to-peer networks, and/or ad-hoc networks.

In some embodiments, as is illustrated in FIG. 1, the electronic device 200 (e.g., the electronic device 200-1) is capable of remotely controlling one or more of the media presentation systems 500. To this end, the electronic device 200 may for example implement, or otherwise utilize, any of the techniques described in the international patent application PCT/IB2013/001938 (published under WO 2014/001913 A2). For example, it is possible for a user of the electronic device 200 (e.g., the electronic device 200-1 in this example) to remotely control the presentation of media at any one or a combination of the media presentation systems 500. In order to give context to the embodiments described throughout this disclosure, the international patent application PCT/IB2013/001938 is incorporated herein by reference. More specifically, the electronic device 200-1 may receive a media control command for a media presentation system 500 (e.g. speaker(s) 500-1). In response to receiving this media control command, the electronic device 200-1 may send a server media control request to the computer server 300 and a local media control request to the media presentation system 500, which may be located within the same local network, e.g. a LAN, as the electronic device 200-1 (i.e., a local network to which both the electronic device 200-1 and the media presentation system 500 are connected). The server media control request may e.g. be sent to the computer server 300 over the Internet. Typically, but not necessarily, the computer server 300 may be associated with an Internet Protocol (IP) address outside the space of the local network to which both the electronic device 200-1 and the media presentation system 500 are connected. As will be appreciated, the electronic device 200-1 and the media presentation system 500 are thus associated with IP addresses within the same sub network. The electronic device 200-1 can thus provide a user interface 230 (see e.g. FIG. 2) that allows a user 600 to select media content for presentation by the electronic device 200-1 itself and, also, to generate media control request(s) to cause the media content to be presented, or played, by the media presentation system 500. Furthermore, the server media request and the local media request are both configured to cause a media control operation, performed at the electronic device 200-1, to be implemented at the media presentation system 500.

In an example scenario related to a social gathering, a host (i.e., a user) may thus interact with his or her electronic device 200-1 to remotely control the playback of media content at the media presentation system 500, e.g. the playback of audio (e.g., songs) through loudspeakers(s) 500-1. This way, it is for example possible for a party host (i.e., the user) to control the playback of music that is being played at a social gathering, such as a party.

Figure 2:
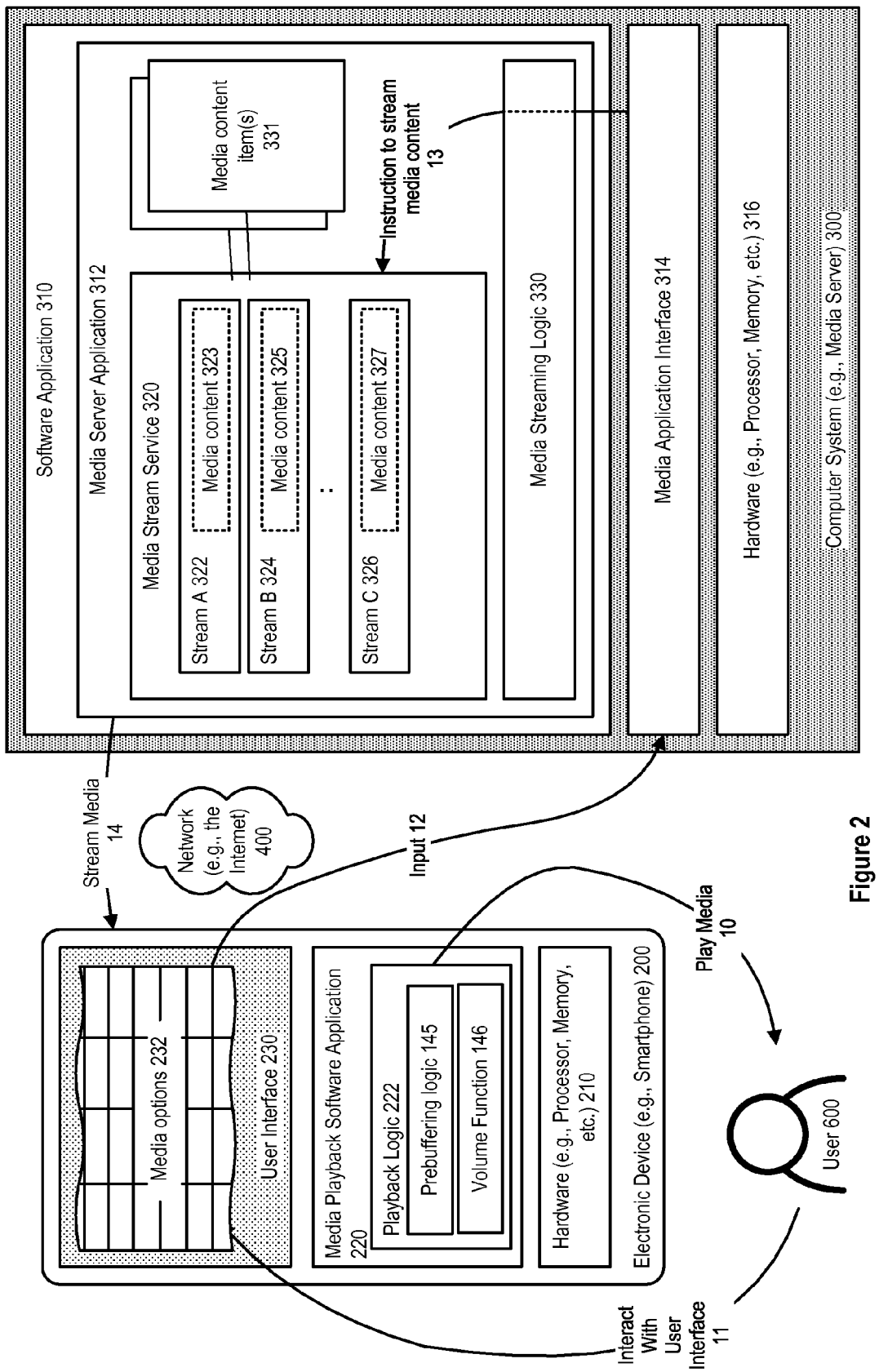
FIG. 2 illustrates an example embodiment of a system for playback of audio streams, in accordance with an embodiment.

Turning now to FIG. 2, an example environment where embodiments of this disclosure may be applied will be described. An electronic device 200, e.g. electronic device 200-1 of FIG. 1, may be communicatively connectable to the computer server 300 via the network 400, e.g. the Internet, as described hereinabove. As can be seen in FIG. 2, only a single electronic device 200 and a single computer server 300 are shown. However, the computer server 300 may support the simultaneous use of multiple electronic devices, and/or the electronic device 200 can simultaneously access media content at multiple computer servers 300. Although FIG. 2 illustrates the computer server 300 in accordance with one example embodiment, FIG. 2 is intended more as a functional description of the various features, or components, which may be present in one or more computer servers, rather than a structural schematic of the various implementations described throughout this disclosure. In practice, and as recognized by persons skilled in the art, components shown separately could be combined and some components could be separated.

In the following description and in order not to obscure the detailed description with unnecessary detail, the media content will in general be exemplified to be audio content, e.g. in form of music. This should, however, not be interpreted as limiting the scope of the various embodiments of the disclosed embodiments.

As is schematically shown in FIG. 2, the electronic device 200 may be used for the playback of media content (e.g., audio content such as music), which is provided by the computer server 300. The electronic device 200 may include one or several physical computer resources, or hardware resources 210. The hardware resources 210 may e.g. include one or several processors (or, processing circuitry), a communications interface (or, communication circuitry) and one or several memories. Likewise, the computer server 300 operating as a media server may include one or several physical computer resources, or hardware resources 316. The hardware resources 316 may likewise include one or several processors (or, processing circuitry), a communications interface (or, communication circuitry) and one or several memories.

The computer server 300 may include an operating system or other processing system which supports execution of a software application 310, including a media server application 312 which may be used, for example, to stream media content. A media stream service 320 may be used to buffer media content, for streaming to one or more media streams 322, 324, 326. A media application interface 314 may receive requests from electronic devices 200 or other systems, to retrieve media content 331 from the computer server 300.

Media content 331, or media items, may be provided, for example, within a first storage such as a memory (e.g., including a database), or may be received by the computer server 300 from another source (not shown). This another source (not shown) could be external to the computer server 300, i.e. it may be located remotely from the computer server 300.

A media streaming logic 330 may be used to retrieve or otherwise access the media content 331 in response to requests from electronic devices 200 or other systems, and populate the media stream service with streams 322, 324, 326 of corresponding media content data 323, 325, 327 that may be returned, i.e. streamed, to the requesting electronic device 200.

The electronic device 200 comprises a user interface 230, which is adapted to display or otherwise provide a visual array of media options 232, for example as a two-dimensional grid, a list, or other visual array format, and determine a user input. Each media option in the visual array of media options 232 correspond to a respective media stream 322, 324, 326.

Selecting a particular media option within the visual array 232 may in some embodiments be used, or otherwise interpreted, as a request or instruction to the media server application 312 to stream or otherwise return a corresponding particular media content item. For example, in accordance with some embodiments, the software application 310 at the computer server 300 may be used to stream or otherwise communicate media content to the electronic device 200, wherein the user interface 230 at the electronic device 200 is adapted to display a plurality of media options that correspond to respective media streams.

In accordance with some embodiments, the electronic device 200 may also include a media playback application 220, together with a playback logic 222, pre-buffering logic 145, and a volume function 146, which may be used to control the playback of media content that is received from the media server application 312, for playback by the electronic device 200, as described in further detail below.

A user 600 may interact 11 with the user interface 230 and issue requests, for example the playing of a selected media option at the electronic device 200. The user's selection of a particular media option may be communicated 12 to the media server application 312, via the media application interface 314. The media server application 312 may then be instructed 13 to stream corresponding media content 13, including one or more streams of media content data 323, 325, 327, and subsequently stream 14 or otherwise communicate the selected media to the user's electronic device 200. In accordance with some embodiments, pre-buffering requests from the electronic device 200 may also be communicated 12 to the media server application 312 via the media application interface 314. At the electronic device 200, in response to the user's interaction with the user interface 230, the media playback application 220, including the playback logic 222, may play 10 the requested media content to the user 600.

FIGS. 3A-3D illustrate an electronic device 200 which supports playback of audio content associated with respective audio items. The electronic device 200 typically comprises a user interface 230 as described earlier with reference to FIG. 2. The user interface 230 typically includes output device(s) and input device(s), as is known and conventional in the art. In some implementations, the input devices may include a keyboard, a mouse or a track pad. Alternatively, or in addition, in some implementations, the user interface 230 includes a display that includes a touch-sensitive surface, in which case the display is a touch-sensitive display. In electronic devices 200 that have a touch-sensitive display, a soft keyboard may be displayed when keyboard entry is needed. Typically, a soft keyboard is a keyboard that replaces the physical keyboard on electronic devices 200 having touch-sensitive displays. Hence, in electronic devices 200 that have a touch-sensitive display a physical keyboard is optional. The output device(s) may for example include one or more speakers and/or one or more audio output connections for connection to external speaker(s), headphones or earphones. Optionally, the input devices may further include an audio input device (e.g., a microphone) to capture audio (e.g., speech). Still further, the input devices may also optionally comprise audio recognition device(s) to recognize audio (e.g., speech), which in combination with a microphone, may for example supplement or replace the keyboard.

Figure 3A:
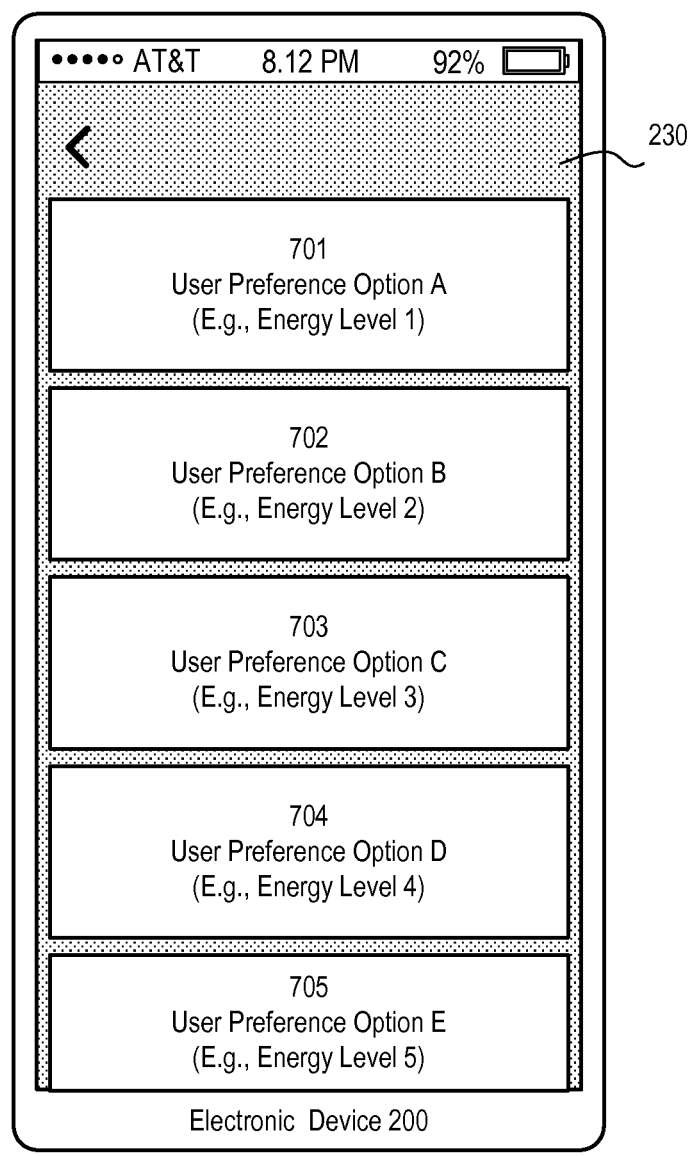
FIGS. 3A-3D schematically illustrates an example embodiment of a user interface of an electronic device, e.g. in the form of a smart phone, which supports playback of audio and a dynamic control of playlists.

In an embodiment, such as in the example embodiment illustrated in FIG. 3A, the user interface 230 includes a display that comprises a touch-sensitive surface. An exemplary user interface 230 of the electronic device 200 is hence schematically illustrated in FIG. 3A. In the example embodiment of FIG. 3A, a visual array of one or several selectable user preference options A (701), B (702), C (703), D (704) and E (705) is displayed at the user interface 230. Each selectable user preference option A (701), B (702), C (703), D (704) and E (705) is associated with a respective energy level. For example, the energy level may be indicative of a tempo (e.g., measured in terms of Beats Per Minute (BPM)).

As will be appreciated, user preference option A (701) may be associated with an energy level which is higher than that of user preference option B (702). In other words, user preference option A (701) may be associated with a tempo (e.g., measured in BPM) which is higher than that of user preference option B (702). Likewise, user preference option B (702) may be associated with an energy level which is higher than that of user preference option C (703), and so forth. In an alternative embodiment, user preference option A (701) may be associated with an energy level which is lower than that of user preference option B (702). In other words, user preference option A (701) may be associated with a tempo (e.g., measured in BPM) which is lower than that of user preference option B (702). Likewise, user preference option B (702) may be associated with an energy level which is lower than that of user preference option C (703), and so forth. In still other embodiments, the various user preference options 701-705 are not associated with a certain order of the energy level (i.e., from high to low or from low to high, as described above) but can, instead, be provided in any random order.

In advantageous embodiments, each one of the various user preference options A (701), B (702), C (703), D (704) and E (705) corresponds to a respective mood option. In other words, a visual array of one or several selectable mood options A (701), B (702), C (703), D (704) and E (705) can be displayed at the user interface 230. Each mood option may hence be associated with a respective mood, i.e. an emotional state or state of mind (such as happy, calm, energetic, and depressed, etc.). As will be appreciated, each selectable mood option A (701), B (702), C (703), D (704) and E (705) is further associated with a certain (e.g., pre-defined) energy level. Typically, but not necessarily, mood options corresponding to positive moods may be associated with higher energy levels as compared to mood options corresponding to negative moods. Or said differently, mood options corresponding to negative moods may be associated with lower energy levels as compared to mood options corresponding to positive moods.

Figure 3B:
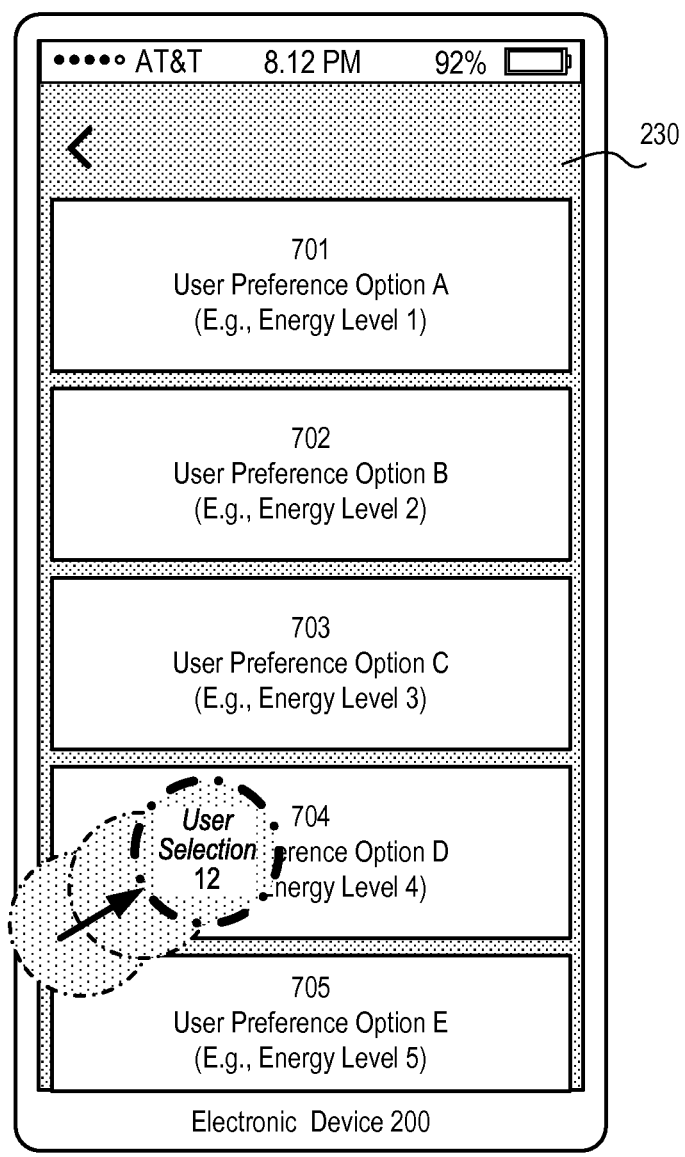
Figure 3C:
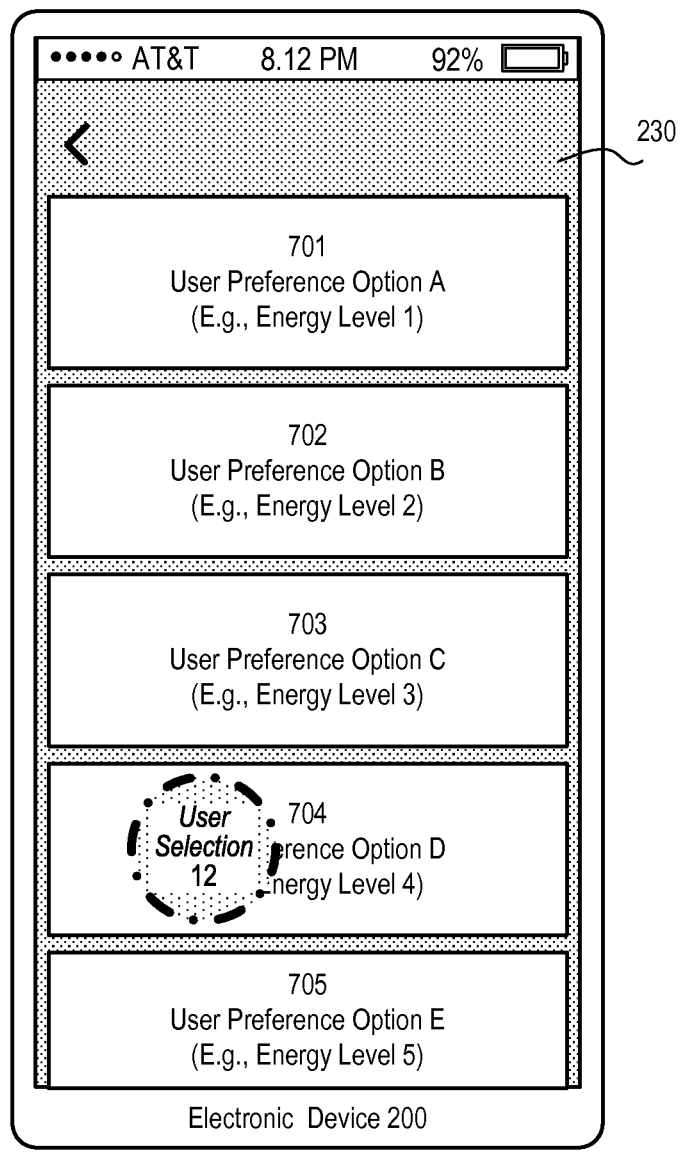

Turning now to FIG. 3B, a user 600 may e.g. perform a first control gesture. The first control gesture may for example be a hovering gesture (e.g., by the user's finger or by means of a stylus) over the display area of the display of the user interface 230 to approach, and eventually reach, the display area of a desired selectable mood option (in this example mood option D (704)). As can be seen in FIGS. 3B and 3C, upon reaching the display area corresponding to the desired mood option (i.e., mood option D (704) in this example), the user 600 may further perform another, i.e. second, control gesture. For example, the second control gesture may be a press gesture or tap gesture within the display area corresponding to the desired mood option. This press gesture or tap gesture within the display area corresponding to the desired mood option may be interpreted by the electronic device 200 to be a request, or instruction, to select the thus pressed, or tapped, mood option (i.e., mood option D (704) in this example). In this embodiment, the above-mentioned press gesture or tap gesture may also be interpreted by the electronic device 200 to be a request, or instruction, to adjust an energy level (e.g., a tempo) associated with a playlist (see FIG. 3D).

As will be appreciated from the description herein, each selectable mood option 701-705 may be understood as associated with an automatically generated playlist that is generated by the computer server system 300 and which is, furthermore, corresponding to a requested energy level corresponding to the selected mood option from the list of mood options 701-705.

In advantageous embodiments, the electronic device 200 is further adapted to send, i.e. transmit, a data message including an instruction to the computer server system 300 (see FIG. 2) to return a proposed playlist of audio items in accordance with the requested energy level (i.e., energy level 4 corresponding to mood option D (704) in this example). The above-mentioned data message may for example also comprise i) information about the selected mood option (i.e. mood option D (704) in this example), ii) information about the energy level (e.g., tempo) associated with the selected mood option, and/or iii) an instruction to generate a proposed playlist including audio items having an energy level (e.g., tempo) corresponding to the requested energy level (e.g., tempo). Accordingly, the computer server system 300 may be adapted to receive the above-mentioned data message including the instruction to return said proposed playlist. In response to receiving this data message, the computer server system 300 is capable of generating a proposed playlist of audio items in accordance with the requested energy level (e.g., tempo). There exist various techniques for generating suggested playlists on the basis of different factors, which are known in the art. For example, the U.S. Patent Application Publication No. 2014/0280181 A1 describes some techniques for generating playlists that could be used. U.S. Patent Application Publication No. 2014/0280181 A1 is incorporated herein by reference to give context to the embodiments described in this disclosure. In accordance with one embodiment, the audio content associated with the different audio items may be classified on the basis of their respective energy level. As described earlier, the energy level may be defined as the tempo, e.g., measured in BPM. The various available audio content that can be streamed, or otherwise communicated, from the computer server 300 to the electronic device 200 can thus be classified in different energy level classifications depending on their energy level. Based on this classification of energy levels, a playlist generator logic (not shown in FIG. 2) may be configured to generate, or otherwise create, suitable playlists including audio content 323, 325, 327 etc. in dependence of the energy level of the audio content to be streamed, or otherwise communicated, to the electronic device 200. The generation of playlists per se is not the main focus of this disclosure and will therefore not be described in any further detail herein.

Figure 3D:
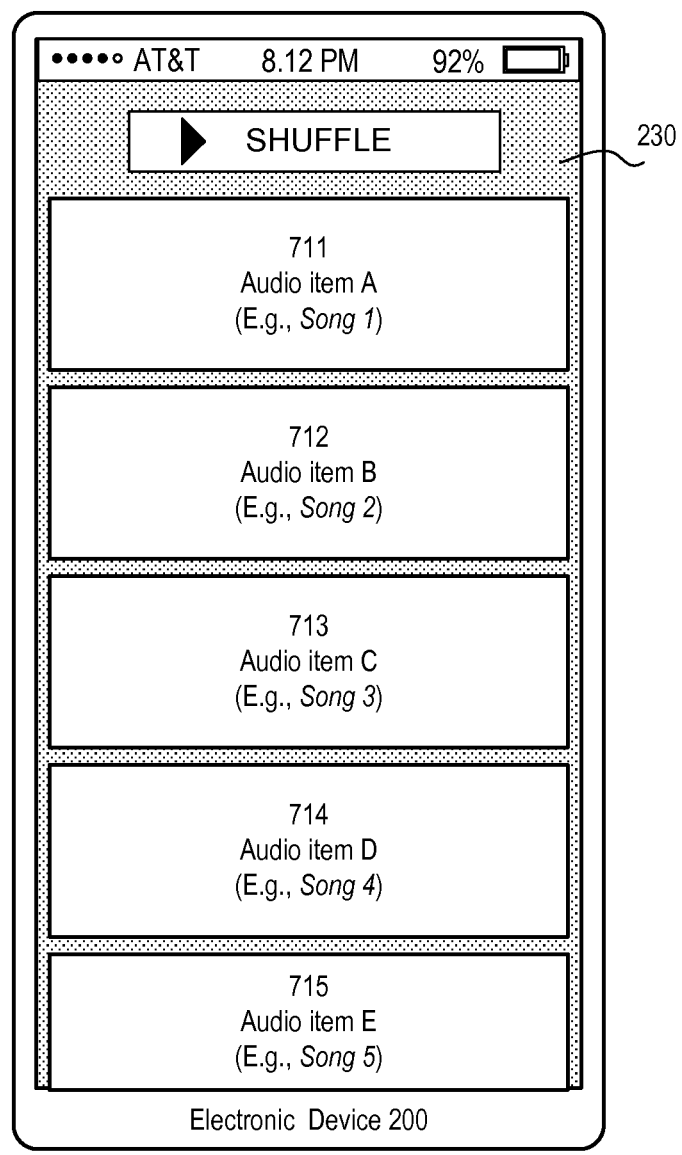

Subsequently, the electronic device 200 may receive a data message including data related to the proposed playlist of audio items that was generated by the computer server system 300. The electronic device 200 may further be configured to generate or otherwise create a visual queue of selectable audio items corresponding to the proposed playlist based on the received data related to the proposed playlist. In response thereto, a visual queue of selectable audio items 711-715 can be displayed or otherwise presented at the user interface 230 of the electronic device 200, as is schematically illustrated in FIG. 3D.

In view of the above, it will be appreciated that the visual queue of selectable audio items 711-715 can be adjusted (or, prepared) on the basis of a requested energy level (e.g., tempo as measured in BPM).

In one embodiment, the media playback application 220, including the playback logic 222, may begin playing 10 (see FIG. 2) the audio content to the user 600 in the order defined by the displayed visual queue of selectable audio items 711-715. That is, audio content corresponding to audio item 701 is played first and then the next audio content corresponding to audio item 702 is played, and so forth. Alternatively, or in addition to, upon a user selection 12 (e.g., a third control gesture in the form of a press gesture or a tap gesture within the display area denoted "SHUFFLE") the media playback application 220, including the playback logic 222, may begin playing 10 the audio content to the user 600 in a random order, i.e. the audio content corresponding to the displayed visual audio options can be played in any random order. Additionally, or alternatively, upon a user selection 12 (e.g., a fourth control gesture in the form of a press gesture or a tap gesture within a display area corresponding to a desired audio item from the list of audio items included in the playlist) the media playback application 220, including the playback logic 222, may begin playing 10 the audio content corresponding to the thus selected audio item. Selecting a particular audio item within the visual queue of selectable audio items 711-715 may in some embodiments be used, or otherwise interpreted, as a request or instruction to the media server application 312 of the computer server 300 to stream or otherwise return a corresponding particular audio content item. For instance, in accordance with some embodiments, the software application 310 at the computer server 300 may be used to stream or otherwise communicate audio content to the electronic device 200 for playback to the user 600.

The embodiments described with reference to FIG. 3A-3D may allow for an improved playback of streamed audio content, e.g. at social gatherings such as parties. The embodiments described with reference to FIGS. 3A-3D may for example allow for a user of the electronic device 200 to dynamically control the energy level (e.g., a tempo) of the audio items included in a playlist by using his or her electronic device. In some advantageous embodiments, the streamed audio (e.g., songs) that is/are going to be played at the social gathering can be controlled based on a mood, i.e. an emotional state or a state of mind. Thus, in one example scenario, a party host (i.e., the user) may dynamically control the tempo of the songs to be played on the basis of the current mood of the people at the party. This may improve the experience of the people at social gatherings such as parties.

Figure 4A:
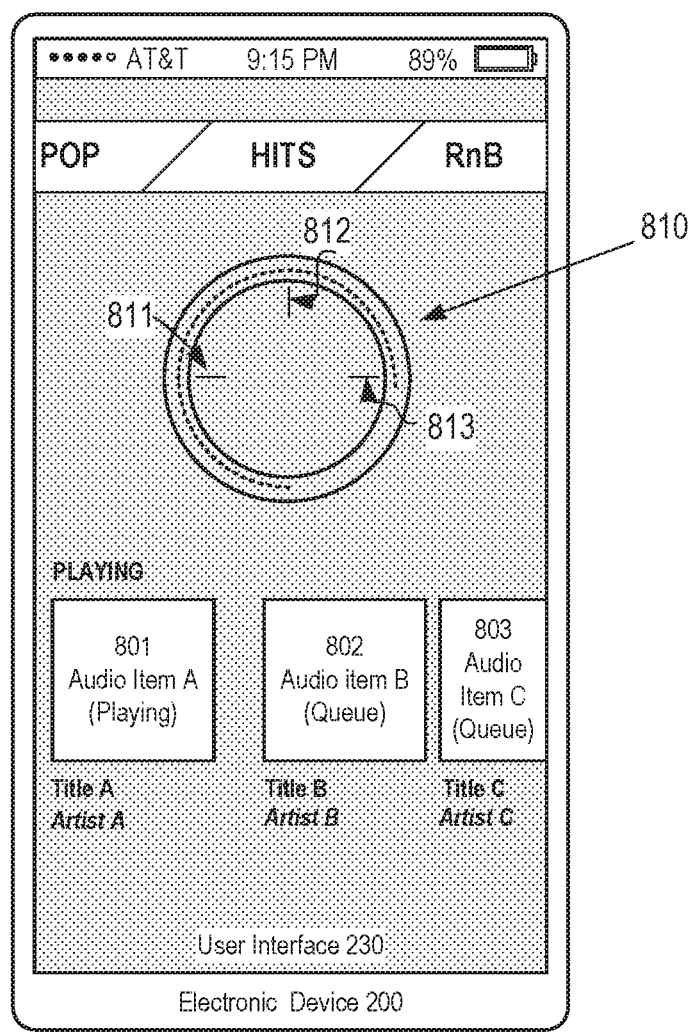
FIGS. 4A-4C schematically illustrates another example embodiment of a user interface of an electronic device, e.g. in the form of a smart phone, which supports playback of audio and a dynamic control of playlists.
Figure 4B:
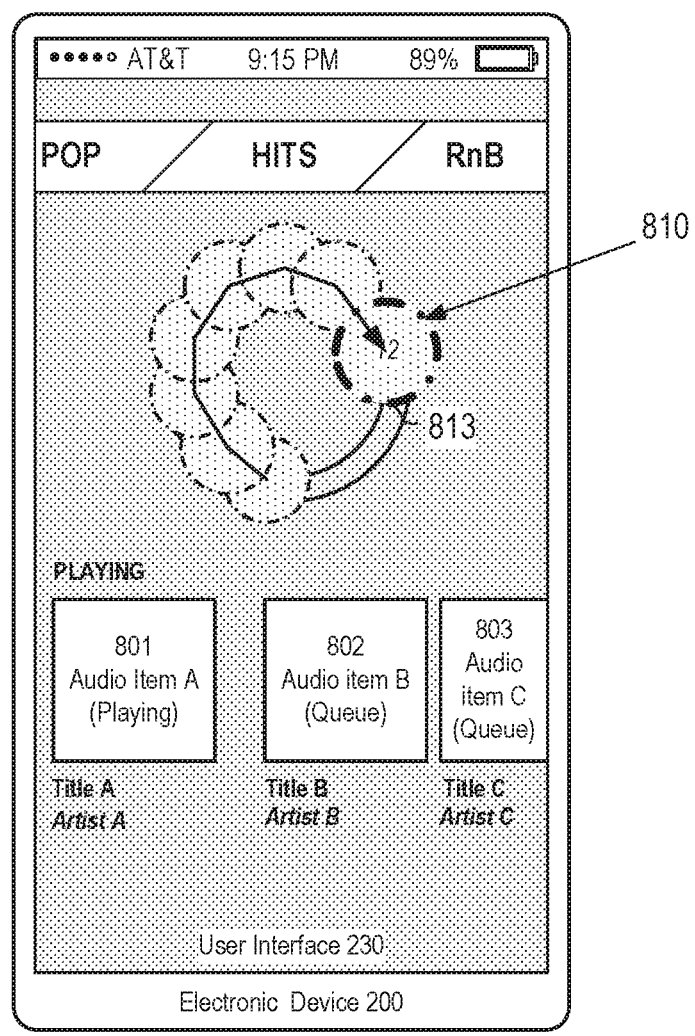
Figure 4C:
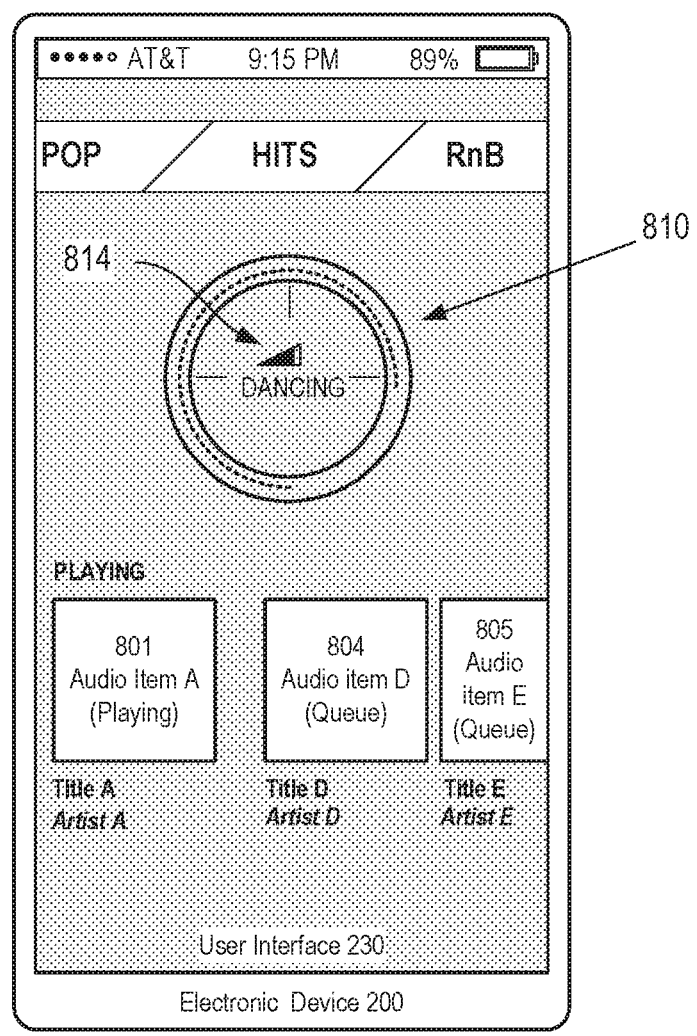

With reference to FIGS. 4A-4C, another embodiment will be briefly described. In this example embodiment, a visual array 810 of mood options is represented by a soft keyboard including a circular control device. The circular control device includes different mood options, or levels, 811, 812, 813. The different mood levels 811, 812 and 813 may represent different emotional states. In an example embodiment, mood level 811 may represent a low energy level (e.g. "chill"), mood level 812 may represent a medium energy level (e.g., "upbeat") and mood level 813 may represent a high energy level (e.g., "dancing"). Hence, each of the mood levels 811-813 is associated with a respective energy level (e.g., a tempo as measured in BPM). For example, the low energy level such as "chill" would typically have lower value of BPM as compared to the medium energy level such as "upbeat". Likewise, a high energy level such as "dancing" would typically have a higher value of BPM as compared to the medium energy level such as "upbeat". In some embodiments, the circular control device may be capable of visualizing that a user selection 12 of the mood option can be made from a low energy level (e.g., "chill") to a higher energy level (e.g., "dancing"). For example, as can be seen in FIG. 4B, upon a user 600 performing a hovering gesture along the circular control device 810, the user may select his or her mood option 811, 812 or 813. In this example, the user 600 performs a hovering gesture from a start position of the circular control device to an end position corresponding to a position at the mood option 813. Upon the user 600 completing his or her hovering gesture at the position of the mood option 813, this can be interpreted by the electronic device 200 to represent a user selection of mood option 813. In response to receiving this request, the queue of subsequently playable audio items can be adjusted accordingly, as can be seen in FIG. 4C.

As can be seen in FIG. 4A, audio content corresponding to audio item A (801) is currently being played. The audio content may e.g. be played to the user 600 through loudspeaker(s) of the user interface 230 of the electronic device. Alternatively, the audio content may be played through external loudspeaker(s) 500-2 that are remotely controlled by the electronic device 200 (see FIG. 1). While the audio content corresponding to audio item A (801) is being played, a visual queue of selectable audio items B (802) and C (803) of a playlist is also displayed, or otherwise presented, at the user interface 230 of the electronic device. Furthermore, while the audio content corresponding to audio item A (801) is being played a user 600 may perform a hovering gesture (see FIG. 4B) from the start position of the circular control device to another position corresponding to a position at the mood option 813. Upon the user 600 completing his or her hovering gesture at the position of the mood option 813, this can be interpreted by the electronic device 200 to represent a user selection of mood option 813. In response to receiving this request, the queue of subsequently playable audio items can be adjusted accordingly, as can be seen in FIG. 4C. The new visual queue of selectable audio items D (804) and E (805) of a playlist is displayed, or otherwise presented, at the user interface 230 of the electronic device 200. Each of the audio items D (804) and E (805) has an energy level (e.g., a tempo measured in BPM) corresponding to the selected, thus requested, mood option (i.e. mood option 813 "dancing" in this example). Optionally, an icon 814 representing the selected mood option (here exemplified by mood level 813) may also be displayed at the user interface 230. Hereby, the user 600 of the electronic device 200 can be informed about the selected mood option in a convenient and user-friendly way.

In advantageous embodiments, the electronic device 200 is adapted to send, i.e. transmit, a data message including an instruction to the computer server system 300 (see FIG. 2) to return a proposed playlist of audio items in accordance with the requested energy level (i.e., a high energy level corresponding to mood option 813 in this example). The above-mentioned data message may for example also comprise i) information about the selected mood option (i.e. mood option 813 in this example), ii) information about the energy level associated with the selected mood option, and/or iii) an instruction to generate a proposed playlist including audio items having an energy level (e.g., tempo) corresponding to the requested energy level (e.g., tempo). Accordingly, the computer server system 300 may be adapted to receive the above-mentioned data message including the instruction to return said proposed playlist. In response to receiving this data message, the computer server system 300 is capable of generating a proposed playlist of audio items in accordance with the requested energy level (e.g., tempo). As described earlier, there exist various techniques for generating suggested playlists on the basis of different factors, which are e.g. known from the US Patent Application Publication US 2014/0280181 A1. Therefore, this will not be repeated here. Subsequently, the electronic device 200 may hence receive a data message including data related to the proposed playlist of audio items that is generated by the computer server system 300. The electronic device 200 may further be configured to generate or otherwise create a visual queue of selectable audio items corresponding to the proposed playlist based on the received data related to the proposed playlist. In response thereto, the visual queue of selectable audio items 804, 805, etc. can be displayed or otherwise presented at the user interface 230 of the electronic device 200, as is schematically illustrated in FIG. 4C. It will thus be appreciated that the visual queue of selectable audio items 802, 803, 804, 805, etc. can be adjusted on the basis of a requested energy level based on the earlier-mentioned selection carried out by the hovering gesture, as schematically illustrated in FIG. 4B.

In one embodiment, the media playback application 220, including the playback logic 222, may begin playing 10 (see FIG. 2) the audio content to the user 600 in the order defined by the displayed visual queue of selectable audio items 804-805. That is, audio content corresponding to audio item 804 is played immediately after the currently played audio item 801 has finished, or stopped. Thereafter, audio item 805 is played after audio item 804, and so forth. Additionally, or alternatively, upon a user selection 12 (e.g., a control gesture in the form of a press gesture or a tap gesture within a display area corresponding to a desired audio item from the list of audio items 804, 805 included in the playlist) the media playback application 220, including the playback logic 222, may begin playing 10 the audio content corresponding to the thus selected audio item. Selecting a particular audio item within the visual queue of selectable audio items 804, 805, etc. may in some embodiments be used, or otherwise interpreted, as a request or instruction to the media server application 312 of the computer server 300 to stream or otherwise return a corresponding particular audio content item. For instance, in accordance with some embodiments, the software application 310 at the computer server 300 may be used to stream or otherwise communicate audio content to the electronic device 200 for playback to the user 600.

The embodiments described with reference to FIG. 4A-4C may allow for an improved playback of streamed audio content, e.g. at social gatherings such as parties. The embodiments described with reference to FIGS. 4A-4C may for example allow for a user of the electronic device 200 to dynamically control the energy level (e.g., a tempo) of the audio items included in a playlist by using his or her electronic device. In some advantageous embodiments, the streamed audio (e.g., songs) that is/are going to be played at the social gathering can be controlled based on a mood, i.e. an emotional state. Thus, in one example scenario, a party host (i.e., the user) may dynamically control the tempo of the songs to be played on the basis of the current mood of the people at the party. This may improve the experience of the people at social gatherings such as parties.

Figure 5A:
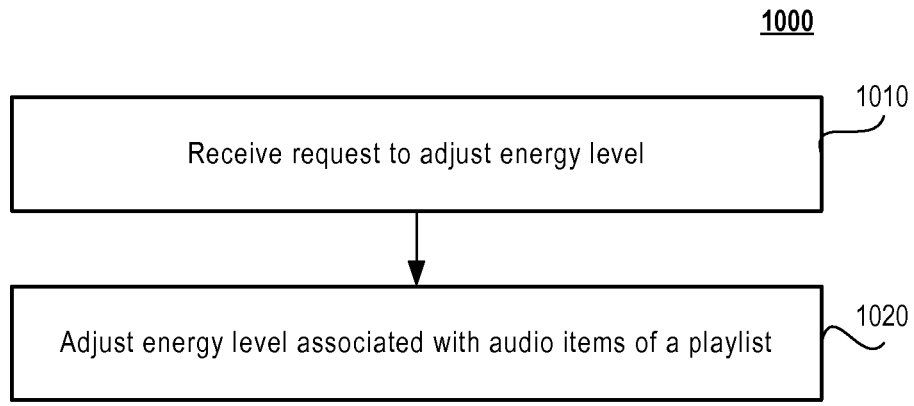
FIGS. 5A-5B schematically illustrate flowcharts of a method in accordance with an embodiment.
Figure 5B:
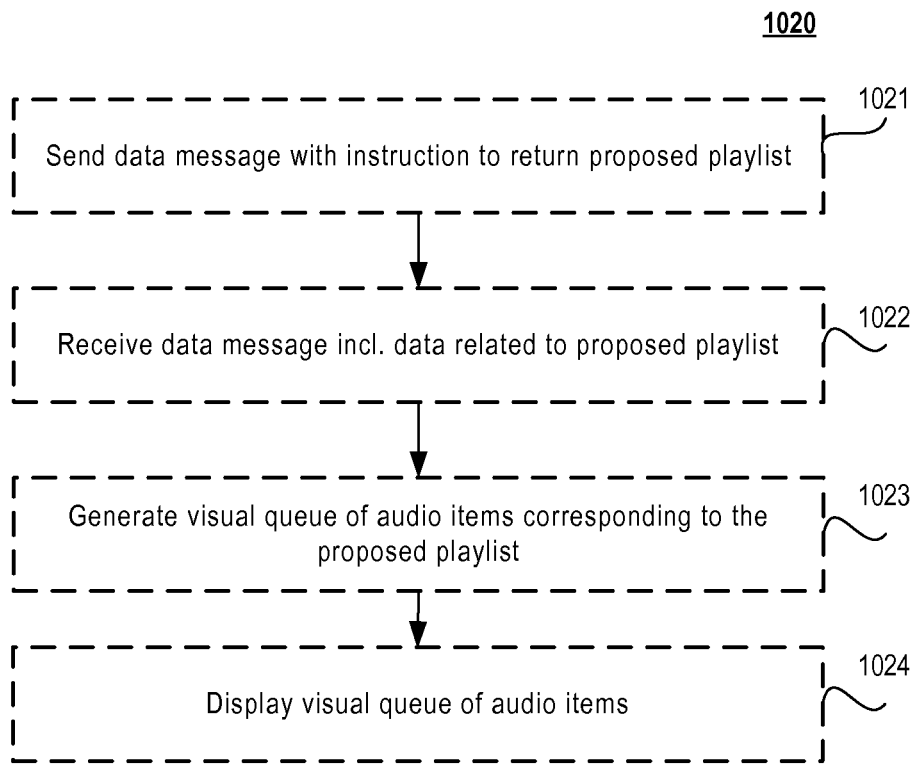

With reference to FIGS. 5A-5B, an embodiment of a method 1000 of operating an electronic device for dynamically controlling a playlist of audio items will be described. As described hereinabove, a request to adjust an energy level associated with the playlist is received 1010. In response to receiving 1010 this request, the playlist is adjusted 1020 (or, prepared) in accordance with the requested energy level. Typically, but not necessarily, the energy level is indicative of a tempo of the audio items included in said playlist. The tempo may for example be measured in BPM.

In some embodiments, e.g. as schematically illustrated in FIG. 5B (and FIG. 6B), the adjusting 1020 (1130) of the playlist may comprise: sending 1021 (1131) a data message including an instruction to a computer server system to return a proposed playlist of audio items in accordance with the requested energy level; and receiving 1022 (1132) a data message including data related to a proposed playlist of audio items. In response thereto, the method may also comprise generating 1023 (1133), based on said data related to the proposed playlist, a visual queue of selectable audio items corresponding to the proposed playlist. Furthermore, in response thereto the visual queue of selectable audio items may be displayed 1024 (1134) at the user interface of the electronic device. Furthermore, audio content corresponding to the displayed audio items may be played (not shown) to the user 600, as described hereinabove.

Figure 6A:
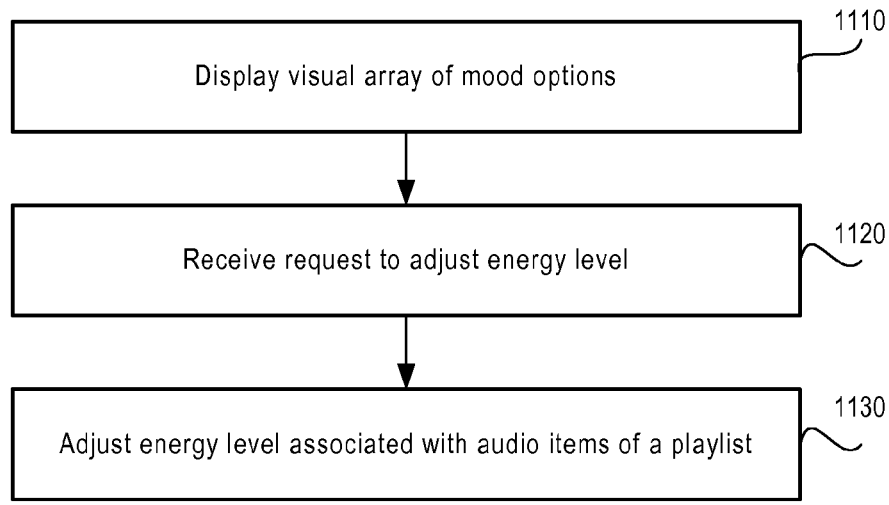
FIGS. 6A-6B schematically illustrate flowcharts of a method in accordance with an embodiment.
Figure 6B:
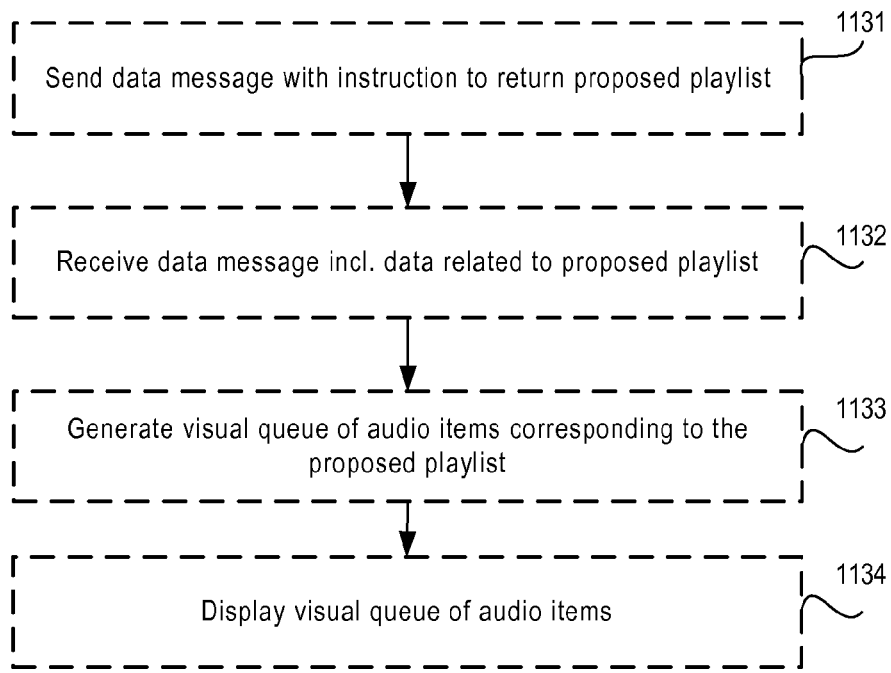

With reference to FIGS. 6A-6B, another embodiment of a method 1100 of operating an electronic device for dynamically controlling a playlist of audio items will be described. A visual array of selectable mood options is displayed 1110 at a user interface of the electronic device. Furthermore, each selectable mood option is associated with a respective mood. Still further, each selectable mood option may be associated with a respective energy level such as a tempo (e.g., measured in BPM). As described hereinabove, a request to adjust an energy level associated with the playlist is received 1120. Receiving 1120 this request may thus include receiving an instruction to select one of the selectable mood options. Furthermore, in response to receiving 1120 this request, the playlist is adjusted 1130 (or, prepared) in accordance with the requested energy level.

Figure 7:
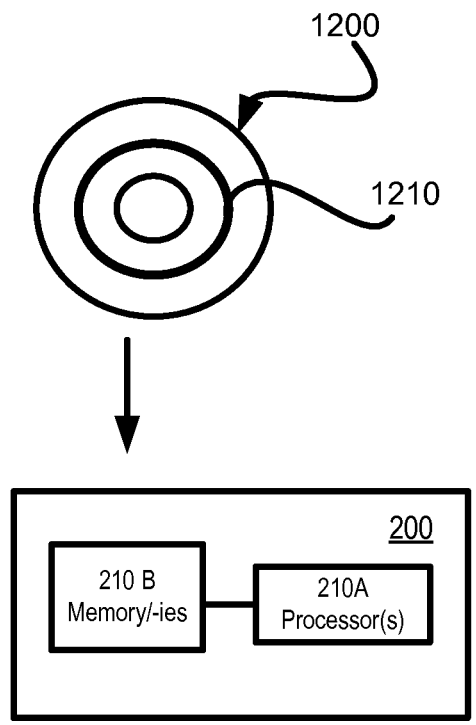
FIG. 7 illustrates a carrier comprising a computer program, in accordance with an embodiment.

Turning now to FIG. 7, still another embodiment will be briefly discussed. FIG. 7 shows an example of a computer-readable medium, in this example in the form of a data disc 1200. In one embodiment the data disc 1200 is a magnetic data storage disc. The data disc 1200 is configured to carry instructions 1210 that can be loaded into a memory 210B of an electronic device 200. Upon execution of said instructions by a processor 210A of the electronic device 200, the electronic device 200 is caused to execute a method or procedure according to any one of the embodiments described in this disclosure. The data disc 1200 is arranged to be connected to or within and read by a reading device (not shown), for loading the instructions into the processor. One such example of a reading device in combination with one (or several) data disc(s) 1200 is a hard drive. It should be noted that the computer-readable medium can also be other mediums such as compact discs, digital video discs, flash memories or other memory technologies commonly used. In such an embodiment the data disc 1200 is one type of a tangible computer-readable medium. The instructions may alternatively be downloaded to a computer data reading device, such as an electronic device 200 capable of reading computer coded data on a computer-readable medium, by comprising the instructions in a computer-readable signal (not shown) which is transmitted via a wireless (or wired) interface (for example via the Internet) to the computer data reading device for loading the instructions into a processor 210A of the electronic device 200. In such an embodiment, the computer-readable signal is one type of a non-tangible computer-readable medium.

Figure 8:
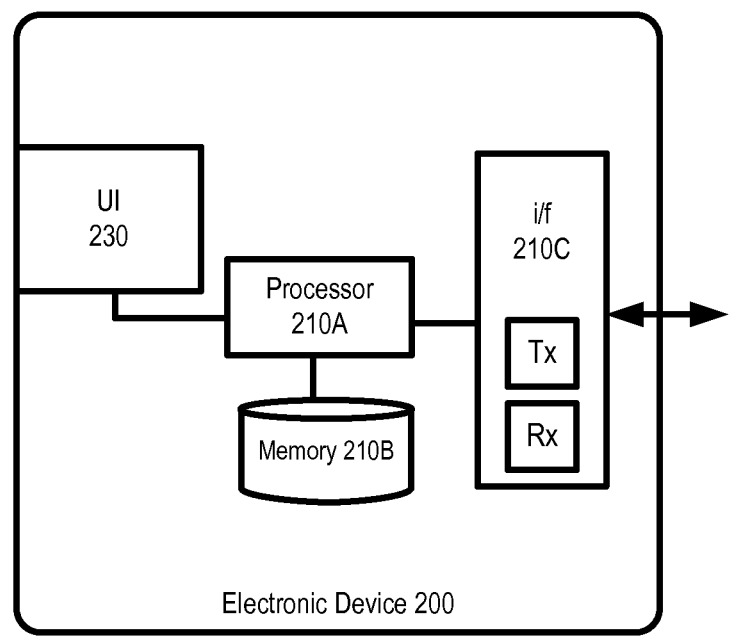
FIG. 8 illustrates an example implementation of an embodiment of an electronic device as illustrated in any one of FIGS. 1-4.

With reference to FIG. 8, an example embodiment of the electronic device 200 of FIGS. 1-4 will be described in some further detail. Advantageously, the electronic device 200 may be embodied as a portable electronic device, such as a mobile telephone, a cellular telephone, a tablet computer, a laptop computer, or a personal digital assistant. Alternatively, the electronic device 200 may be implemented as a stationary electronic device, such as a stationary computer.

In some embodiments, the electronic device 200 may comprise means adapted to perform the method described herein with reference to FIGS. 5 through 6. In one embodiment, the electronic device 200 thus comprises means adapted to receive a request to adjust an energy level associated with the playlist and means adapted to adjust the playlist in accordance with the requested energy level in response to receiving said request. As mentioned earlier, the energy level may be indicative of the tempo of the audio items included in said playlist. The tempo may be measured in BPM.

In advantageous embodiments, the electronic device 200 further comprises means adapted to display a visual array of selectable mood options at a user interface of the electronic device, wherein each selectable mood option is associated with a respective mood. Furthermore, each selectable mood option may also be associated with a respective energy level such as a tempo (e.g., measured in BPM). Still further, the electronic device 200 may comprise means adapted to receive an instruction to select one of the selectable mood options. A selection of one of the mood options may be interpreted or otherwise recognized by the electronic device to be the request to adjust the energy level.

In some embodiments, the electronic device additionally comprises means adapted to send a data message including an instruction to a computer server system to return a proposed playlist of audio items in accordance with the requested energy level; means adapted to receive a data message including data related to a proposed playlist of audio items; means adapted to generate, based on said data related to the proposed playlist, a visual queue of selectable audio items corresponding to the proposed playlist; and means adapted to display the visual queue of selectable audio items at the user interface of the electronic device.

Furthermore, electronic device 200 may comprise means adapted to playback audio content, e.g. to the user 600 of the electronic device 200.

With continued reference to FIG. 8, an example implementation of the electronic device 200 will now be described. The electronic device 200 is configured to execute, or otherwise perform, any of the methods described herein. As is schematically illustrated in FIG. 8, the electronic device 200 comprises hardware 210A-C. For example, the electronic device 200 may comprise one or more processors 210A and one or more memories 210B. Also, a communications interface 210C may be provided in order to allow the electronic device 200 to communicate with other electronic devices and/or computer servers 300, e.g. via a network 400 such as the Internet. To this end, the communications interface 210C may comprise a transmitter (Tx) and a receiver (Rx). Alternatively, the communications interface 210C may comprise a transceiver (Tx/Rx) combining both transmission and reception capabilities. The communications interface 210C may include a radio frequency (RF) interface allowing the electronic device 200 to communicate with other devices and/or computer servers 300 through a radio frequency band through the use of different radio frequency technologies such as LTE (Long Term Evolution), WCDMA (Wideband Code Division Multiple Access), any other cellular network standardized by the 3rd Generation Partnership Project (3GPP), or any other wireless technology such as Wi-Fi, Bluetooth®, etcetera. Thus, the electronic device 200 may for example be configured to remotely control media presentation system(s) 500 as described earlier hereinabove. The electronic device 200 may further comprise a user interface 230, which may be comprised of a display and a keypad. Advantageously, the user interface includes a touch-sensitive display as described earlier in this disclosure. As such, the touch-sensitive display may be a touch screen display upon which virtual keys may be displayed and operated. Furthermore, the user interface 230 may include output means such as loudspeakers (not shown) and/or one or several audio output connections as described earlier herein. As described with reference to FIG.

1, the electronic device 200 may also comprise one or more applications, e.g. the media playback application 220. These applications may include sets of instructions (e.g., computer program code) that when executed by the one or more processors 210A controls the operation of the electronic device 200.

In some implementations, the one or more memories 210B stores computer program code, which, when run in the one or more processors 210A causes the electronic device 200 to receive a request to adjust an energy level associated with the playlist; and in response thereto adjust the playlist in accordance with the requested energy level. As mentioned earlier, the energy level may be indicative of the tempo of the audio items included in said playlist. The tempo may be measured in BPM.

In advantageous embodiments, the user interface 230 is further adapted to display a visual array of selectable mood options, wherein each selectable mood option is associated with a respective mood. Each selectable mood option may also be associated with a respective energy level such as a tempo (e.g., measured in BPM). Furthermore, the memory may store computer program code, which, when run in the processor causes the user interface 230 to receive an instruction to select one of the selectable mood options. A selection of one of the mood options may be interpreted or otherwise recognized by the electronic device to be the request to adjust the energy level.

Moreover, in some embodiments, the memory may also store computer program code, which, when run in the processor causes the electronic device to send, by means of the transmitter, a data message including an instruction to a computer server system to return a proposed playlist of audio items in accordance with the requested energy level; and receive, by means of the receiver, a data message including data related to a proposed playlist of audio items; in response thereto generate, based on said data related to the proposed playlist, a visual queue of selectable audio items corresponding to the proposed playlist; and in response thereto display the visual queue of selectable audio items at the user interface.

Furthermore, the memory may stores computer program code, which, when run in the processor causes the electronic device to playback audio content, e.g. to the user 600 of the electronic device 200.

The various embodiments described throughout this disclosure may allow a user of an electronic device to dynamically control the energy level (e.g., the tempo) of a playlist of audio items, such as songs. In some advantageous embodiments, the energy level of a playlist may be adjusted based on a selected mood option corresponding to a selected mood. Thus, in one example scenario, a party host (i.e., a user) may dynamically control the tempo of songs to be played next based on a current mood of the people at a social gathering (e.g., a party). This may improve the experience of social gatherings such as parties. According to some embodiments, it may also be possible to influence the mood of people at a social gathering. For example, if a user wishes to change the mood of the people at a social gathering, he or she may in some embodiments select a mood option to adjust the energy level of the playlist and, accordingly, the songs to be played next at the social gathering.

In the detailed description hereinabove, for purposes of explanation and not limitation, specific details are set forth in order to provide a thorough understanding of various embodiments described in this disclosure. In some instances, detailed descriptions of well-known devices, components, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated that block diagrams herein can represent conceptual views of illustrative circuitry or other functional units embodying the principles of the described embodiments. Similarly, it will be appreciated that any flow charts and the like represent various processes which may be substantially represented in computer readable medium and so executed by a computer or processor, whether or not such computer or processor is explicitly shown. The functions of the various elements including functional blocks, may be provided through the use of hardware such as circuit hardware and/or hardware capable of executing software in the form of coded instructions stored on the above-mentioned computer readable medium. Thus, such functions and illustrated functional blocks are to be understood as being hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. As one mere example, while certain gestures (e.g., hovering gestures, press gestures, and tap gestures) have been described to exemplify some embodiments, other conceivable gestures also exist (e.g. flick gestures, swipe gestures, swipe-and-hold gestures, release-of-hold gestures) that could be contemplated when reducing embodiments described herein into practice.

Furthermore, it should be appreciated that embodiments described in this disclosure could be advantageously combined with any one of the embodiments described in the co-filed U.S. patent application Ser. No. 14/714,145, filed on May 15, 2015, entitled "PLAYBACK OF MEDIA STREAMS AT SOCIAL GATHERINGS", inventors Souheil Medaghri Alaoui, et al and/or in the co-filed U.S. patent application Ser. No. 14/714,148, filed on May 15, 2015, entitled "METHODS AND DEVICES FOR ADJUSTMENT OF THE ENERGY LEVEL OF A PLAYED AUDIO STREAM", inventors Souheil Medaghri Alaoui, et al, both of which patent applications are incorporated herein by reference in their entirety.

Still further, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality.

What is claimed is:

1. A method of operating an electronic device for dynamically controlling a playlist of audio items, the method comprising:
    displaying, at a user interface adapted to receive user inputs, an interaction device that enables selection from a plurality of mood options, and displaying, at the user interface, a visual queue of selectable media content items,
        wherein the interaction device comprises a plurality of regions, each region corresponding to a mood option and each mood option being associated with an energy level, and
        wherein the visual queue of selectable media content items indicates a media content item currently being played and indicates subsequently playable media content items;
    detecting, at the interaction device, a hovering gesture of a user from a start position at a first region on the interaction device to an end position at a second region on the interaction device;
    interpreting completion of the hovering gesture at the second region as a user selection of a mood option corresponding to the second region;
    communicating with a media server to determine a proposed playlist of media content items that matches the energy level associated with the selected mood option; and
    in response to said user selection, and responsive to receiving the proposed playlist from the media server, dynamically adjusting the playlist in accordance with the associated energy level, including
        replacing one or more media content items that are currently queued to be played at the electronic device, with media content items of the proposed playlist.

2. The method of claim 1, wherein the energy level is indicative of an average tempo of the media content items included in said playlist.

3. The method of claim 2, wherein said tempo is measured in Beats Per Minute, BPM.

4. The method of claim 1, further comprising:
    adjusting the visual queue of selectable media content items to indicate new subsequently playable media content items corresponding to the media content items of the proposed playlist.

5. The method of claim 4, further comprising, in response to said user selection, displaying, at the user interface, an icon representing the selected mood option.

6. The method of claim 1, wherein adjusting the playlist in accordance with the associated energy level comprises:
    sending a data message including an instruction to a computer server system to return a proposed playlist of audio items in accordance with the associated energy level; and
    receiving a data message including data related to the proposed playlist of audio items; in response thereto
    generating, based on said data related to the proposed playlist, a visual queue of selectable audio items corresponding to the proposed playlist; and in response thereto
    displaying the visual queue of selectable audio items at the user interface of the electronic device.

7. The method of claim 6, wherein the energy level is indicative of an average tempo of the audio items included in said playlist.

8. The method of claim 1, wherein
    the plurality of regions of the interaction device correspond to a low energy level, a medium energy level, and a high energy level.

9. The method of claim 1, further comprising, in response to a user selection of a selectable media content item within the visual queue, playing the corresponding media content item.

10. An electronic device for dynamically controlling a playlist of audio items, the electronic device comprising:
    a processor; and
    a memory storing computer program code, which, when run in the processor causes the electronic device to
    display, at a user interface adapted to receive user inputs, an interaction device that enables selection from a plurality of mood options, and display, at the user interface, a visual queue of selectable media content items,
        wherein the interaction device comprises a plurality of regions, each region corresponding to a mood option and each mood option being associated with an energy level, and
        wherein the visual queue of selectable media content items indicates a media content item currently being played and indicates subsequently playable media content items;
    detect, at the interaction device, a hovering gesture of a user from a start position at a first region on the interaction device to an end position at a second region on the interaction device;
    interpret completion of the hovering gesture at the second region as a user selection of a mood option corresponding to the second region;
    communicate with a media server to determine a proposed playlist of media content items that matches the energy level associated with the selected mood option; and in response to said user selection, and responsive to receiving the proposed playlist from the media server, dynamically adjust the playlist in accordance with the associated energy level, including
replacing one or more media content items that are currently queued to be played at the electronic device, with media content items of the proposed playlist.

11. The electronic device of claim 10, wherein the energy level is indicative of an average tempo of the media content items included in said playlist.

12. The electronic device of claim 11, wherein said tempo is measured in Beats Per Minute, BPM.

13. The electronic device of claim 10, wherein
the memory stores computer program code, which, when run in the processor, further causes the electronic device to adjust the visual queue of selectable media content items to indicate new subsequently playable media content items corresponding to the media content items of the proposed playlist.

14. The electronic device of claim 13, wherein the memory stores computer program code, which, when run in the processor, further causes the electronic device to, in response to said user selection, display, at the user interface, an icon representing the selected mood option.

15. The electronic device of claim 10, further comprising:
a transmitter; and
a receiver; wherein
the memory stores computer program code, which, when run in the processor causes the electronic device to:
send, by means of the transmitter, a data message including an instruction to a computer server system to return a proposed playlist of audio items in accordance with the associated energy level; and
receive, by means of the receiver, a data message including data related to the proposed playlist of audio items; in response thereto
generate, based on said data related to the proposed playlist, a visual queue of selectable audio items corresponding to the proposed playlist; and in response thereto
display the visual queue of selectable audio items at the user interface.

16. The electronic device of claim 15, wherein the energy level is indicative of an average tempo of the audio items included in said playlist.

17. The electronic device of claim 10,
wherein the plurality of regions of the interaction device correspond to a low energy level, a medium energy level, and a high energy level.

18. The electronic device of claim 10, wherein the memory stores computer program code, which, when run in the processor, further causes the electronic device to, in response to a user selection of a selectable media content item within the visual queue, play the corresponding media content item.

19. The electronic device of claim 10, wherein the electronic device is a stationary electronic device, such as a stationary computer.

20. The electronic device of claim 10, wherein the electronic device is a portable electronic device, such as a mobile telephone, a cellular telephone, a tablet computer, a laptop computer, a personal digital assistant.

21. A non-transitory computer readable storage medium storing one or more instructions which, when executed on at least one processor, cause the at least one processor to carry out a method of operating an electronic device, the method comprising:
displaying, at a user interface adapted to receive user inputs, an interaction device that enables selection from a plurality of mood options, and displaying, at the user interface, a visual queue of selectable media content items,
wherein the interaction device comprises a plurality of regions, each region corresponding to a mood option and each mood option being associated with an energy level, and
wherein the visual queue of selectable media content items indicates a media content item currently being played and indicates subsequently playable media content items;
detecting, at the interaction device, a hovering gesture of a user from a start position at a first region on the interaction device to an end position at a second region on the interaction device;
interpreting completion of the hovering gesture at the second region as a user selection of a mood option corresponding to the second region;
communicating with a media server to determine a proposed playlist of media content items that matches the energy level associated with the selected mood option; and
in response to said user selection, and responsive to receiving the proposed playlist from the media server, dynamically adjusting the playlist in accordance with the associated energy level, including
replacing one or more media content items that are currently queued to be played at the electronic device, with media content items of the proposed playlist.

22. The method of claim 1, wherein the interaction device that enables selection from a plurality of mood options is a circular control device displayed on the user interface.

23. The method of claim 22, wherein rotating the circular control device between regions associated with different mood options, via the hovering gesture, causes the proposed playlist to be retrieved and the user interface to be updated to display the proposed playlist and its media content items.

24. The electronic device of claim 10, wherein the interaction device that enables selection from a plurality of mood options is a circular control device displayed on the user interface.

25. The electronic device of claim 24, wherein rotating the circular control device between regions associated with different mood options, via the hovering gesture, causes the proposed playlist to be retrieved and the user interface to be updated to display selectable media content items corresponding to the proposed playlist and its media content items.

26. The non-transitory computer readable storage medium of claim 21, wherein the interaction device that enables selection from a plurality of mood options is a circular control device displayed on the user interface.

27. The non-transitory computer readable storage medium of claim 26, wherein rotating the circular control device between regions associated with different mood options, via the hovering gesture, causes the proposed playlist to be retrieved and the user interface to be updated to display selectable media content items corresponding to the proposed playlist and its media content items.

* * * * *